(12) United States Patent
Strand et al.

(10) Patent No.: US 8,394,040 B2
(45) Date of Patent: Mar. 12, 2013

(54) SIGNAL PROCESSING DEVICE FOR PROVIDING FEEDBACK ON CHEST COMPRESSION IN CPR

(75) Inventors: Geir Strand, Stavanger (NO); Jon Nysæther, Hafrsfjord (NO)

(73) Assignee: Laerdal Medical AS, Stavanger (NO)

( * ) Notice: Subject to any disclaimer, the term of this patent is extended or adjusted under 35 U.S.C. 154(b) by 855 days.

(21) Appl. No.: 11/640,120

(22) Filed: Dec. 15, 2006

(65) Prior Publication Data

US 2008/0145827 A1  Jun. 19, 2008

(51) Int. Cl.
*A61H 33/00* (2006.01)

(52) U.S. Cl. .......................... 601/41; 600/587

(58) Field of Classification Search .......... 434/262–275; 600/578, 509, 513, 515, 518–519, 587; 601/41–44; 607/2, 4–6, 59
See application file for complete search history.

(56) References Cited

U.S. PATENT DOCUMENTS

| | | | |
|---|---|---|---|
| D253,490 S | 11/1979 | Reiser | |
| D263,740 S | 4/1982 | Rogers et al. | |
| 4,797,104 A | 1/1989 | Laerdal et al. | |
| 5,241,302 A | 8/1993 | Thong | 340/701 |
| D354,811 S | 1/1995 | Tsushi | |
| 5,496,257 A | 3/1996 | Kelly | |
| 5,589,639 A | 12/1996 | D'Antonio et al. | |
| D378,414 S | 3/1997 | Allen et al. | |
| D425,080 S | 5/2000 | Cappa et al. | D14/492 |
| 6,390,996 B1 | 5/2002 | Halperin et al. | 601/41 |
| D462,696 S | 9/2002 | Sturm | D14/489 |
| D466,215 S | 11/2002 | Lindseth et al. | |
| D468,323 S | 1/2003 | Schmitt | D14/489 |
| 6,587,726 B2 | 7/2003 | Lurie et al. | |
| D482,042 S | 11/2003 | Peters | D14/492 |
| 7,122,014 B2 * | 10/2006 | Palazzolo et al. | 601/41 |
| 7,220,235 B2 * | 5/2007 | Geheb et al. | 601/41 |
| D550,244 S | 9/2007 | Niijima | D14/491 |
| D562,985 S | 2/2008 | Brefka et al. | |
| D572,726 S | 7/2008 | Guimaraes et al. | D14/495 |
| D579,569 S | 10/2008 | Strawn et al. | |
| D585,910 S | 2/2009 | Chen et al. | D14/492 |

(Continued)

FOREIGN PATENT DOCUMENTS

| | | |
|---|---|---|
| DE | 102004007077 | 9/2005 |
| EP | 1609453 | 11/1999 |

(Continued)

OTHER PUBLICATIONS

Abella, Benjamin S. et al., "Quality of Cardiopulmonary Resuscitation During In-Hospital Cardiac Arrest," (Reprinted) JAMA. 2005; vol. 293, No. 3.

(Continued)

*Primary Examiner* — Timothy A Musselman
(74) *Attorney, Agent, or Firm* — Dorsey & Whitney LLP

(57) ABSTRACT

A system for processing chest compression signals is disclosed including a processing unit, a depth signal device, and a threshold device comprising upper and lower thresholds. The system may also include a force signal device. The processing unit is adapted to output a signal depending on values of depth and force signals with respect to the thresholds.

17 Claims, 4 Drawing Sheets

U.S. PATENT DOCUMENTS

| | | | |
|---|---|---|---|
| D588,607 S | 3/2009 | O'Donnell et al. ......... D14/489 |
| D590,509 S | 4/2009 | Costa | |
| D590,837 S | 4/2009 | Dawson et al. ............. D14/492 |
| D593,127 S | 5/2009 | Hosokawa et al. ......... D14/492 |
| 2004/0157199 A1* | 8/2004 | Eggert et al. ................. 434/262 |
| 2007/0292828 A1* | 12/2007 | Kellermann et al. ......... 434/262 |
| 2008/0146973 A1 | 6/2008 | Lund et al. ...................... 601/40 |
| 2008/0146974 A1 | 6/2008 | Lund et al. ...................... 601/41 |
| 2009/0112135 A1 | 4/2009 | Palazzolo et al. | |
| 2009/0187123 A1 | 7/2009 | Hwang et al. | |

FOREIGN PATENT DOCUMENTS

| | | |
|---|---|---|
| EP | 1057451 | 5/2000 |
| EP | 1578340 | 7/2004 |
| EP | 1491176 | 12/2004 |
| GB | 1425833 | 4/1973 |
| JP | 11127372 | 5/1999 |
| WO | WO2006/083882 | 8/2006 |
| WO | WO2006/088373 | 8/2006 |

OTHER PUBLICATIONS

American Heart Association, "Guidelines 2000 for Cardiopulmonary Resuscitation and Emergency Cardiovascular Care," Circulation. 2000; 102 (suppl. I): I-95-I-104., available online at www.circulationaha.org.

Aufderheide, Tom P. et al., "Hyperventilation-Induced Hypotension During Cardiopulmonary Resuscitation," Circulation. 2004; 109, available online at www.circulationaha.org.

van Alem, Anouk P. et al., "Interruption of Cardiopulmonary Resuscitation With the Use of the Automated External Defibrillator in Out-of-Hospital Cardiac Arrest," Annals of Emergency Medicine. Oct. 2003; 42:4.

Wik, Lars et al., "Quality of Cardiopulmonary Resuscitation During Out-of-Hospital Cardiac Arrest," (Reprinted) JAMA. 2005; vol. 293, No. 3.

* cited by examiner

DEPTH 21

FORCE 20

DEPTH 22

SIGNAL PROCESSING DEVICE FOR PROVIDING FEEDBACK ON CHEST COMPRESSION IN CPR

TECHNICAL FIELD

This invention relates to generally to systems and methods for providing feedback regarding chest compressions during CPR.

BACKGROUND OF THE INVENTION

Cardiopulmonary resuscitation (CPR) is a procedure performed as life-saving first aid in the case of a sudden cardiac arrest. The procedure comprises chest compressions and ventilation. Recent publications have pointed out numerous problems with how CPR is being conducted today by professionals.

Aufderheide et al showed in their publication "Hyperventilation-Induced Hypotension During Cardiopulmonary Resuscitation", Circulation. 2004;109 that trained Emergency Medical Services (EMS) personnel had problems ventilating correctly. Even after re-training, the ventilation rate was still too high compared to the "Guidelines 2000 for Cardiopulmonary Resuscitation and Emergency Cardiovascular Care" published by The American Heart Association, in collaboration with International Liaison Committee on Resuscitation, herein after referred to as "the Guidelines".

Van Alem, Sanou and Koster pointed to another problem with the performance of CPR in "Interruption of Cardiopulmonary Resuscitation With the Use of the Automated External Defibrillator in Out-of-Hospital Cardiac Arrest", Annals of emergency medicine 42:4 (October 2003); even trained EMS personnel that performed CPR conducted compressions or ventilations less than 50% of the time at the scene, i.e. hands-off time/inactivity time was too high.

Two articles in the Journal of the American Medical Association (JAMA) published Jan. 19, 2005, Vol 293, No. 3, "Quality of Cardiopulmonary Resuscitation During In-Hospital Cardiac Arrest" by Abella et. al. and "Quality of Cardiopulmonary Resuscitation During Out-of-Hospital Cardiac Arrest" by Wik et. al., conclude that hands off time was too high, the correct compression depth not reached, compression rate was either too low or too high and that hyperventilation happened frequently.

A CPR device is described by Halperin et al in U.S. Pat. No. 6,390,996, "CPR Check Compression Monitor". This device only considers compression. The device uses an accelerometer and a gyroscope and measures continuously. This means that in the case of the rescuer not relieving pressure on the patient's chest between compressions, an error in the measurements will gradually build up.

Other, simpler CPR assist devices base their feedback on force and time. One such device is CPREzy from Medteq Innovations Pty. Ltd.

Some CPR assist devices are part of an Automatic External Defibrilator (AED) or a manual defibrilator. However, acquiring a new defibrillator with a CPR assist device might not be an option for Emergency Medical Systems (EMS) which already have a well functioning AED/Defibrilator system. Such EMS systems would rather consider a standalone solution for CPR measurement and feedback.

One combined CPR assist device and AED device is the CPR-D•padZ™ which is a part of the AEDPlus from Zoll Medical Corporation. This device only considers compressions, and provides audio feedback such as voice instructions and a metronome and visual feedback in the form of numbers on the AED screen.

None of these systems or devices provide feedback on both compression and ventilation activity and they neither provide feedback on inactivity or incomplete hand release/leaning through the full procedure of CPR. These issues are believed to be very important in increasing CPR performance and thus survival rates.

Another problem related to known systems, such as for example the AEDplus from Zoll, is that they are relatively expensive, big and complicated; so that lay rescuers are not likely to keep them available at all times.

Devices made for lay rescuers are described in EP1578340 (Laerdal Medical AS), which describes force sensitive devices giving sound signals for assisting the rescuer, and more particularly a device for placement between the hands of a person performing chest compression and the chest of a patient. Even more particularly the device being the subject of EP1578340 is designed to emit a sound when chest compression is performed with a force exceeding a pre-defined value and optionally also to emit a sound indicating the desirable rate of chest compression. This is obtained in an inexpensive and compact device which may be battery independent and thus always ready for use, or in an embodiment using a battery having very low power consumption.

Practice has shown that sound signals in some cases may be difficult to hear, especially in some emergency situations. The feedback of prior art feedback devices can also often interfere with other events and other information given at the rescue scene and the rescuer can often feel that the feedback is offensive and disturbing in a stressed situation.

Also, there is in some instances a need for a more accurate basis for the feedback to the user. If, for example, the applied force is too strong, there is a risk of hurting the patient. Thus there is in such instances a need for an energy efficient and compact device for providing quality CPR feedback, where the feedback is provided in a way which is dependable and likely for the rescuer to receive and perceive under all possible situations.

SUMMARY OF THE INVENTION

In some embodiments, a system for providing feedback regarding chest compressions in CPR includes a measuring unit, a processing unit and a display unit, where the measuring unit comprises a depth measuring device and/or a force measuring device. The processing unit comprises a depth signal device, a force signal device and a threshold device, and is adapted to output a signal depending on the values of depth and force signals with respect to certain thresholds. The display unit comprises input means and at least one indicator and is adapted to activate the indicators based on the output from the processing device.

The system may also comprise a ventilation measuring device and/or a ventilation signal device in order to measure and provide feedback regarding characteristics of the ventilation of a patient. The ventilation measuring device may be any suitable device able to measure the volume, flow and/or frequency of the ventilation.

The processing unit is adapted for processing chest compression signals and comprises a depth signal device, a force signal device, and a threshold device. The threshold device comprises thresholds, such as upper and lower thresholds. The processing unit is adapted to output a signal depending on the values of depth and force signals with respect to the thresholds.

The depth signal device and the force signal device receive signals representing compression depth and compression force. These signals are in one embodiment provided by the depth measuring device and the force measuring device of the measuring unit.

The processing device outputs a signal depending on the depth and force signal values with respect to the thresholds. This signal may be used as an input to the display unit in order to provide feedback to the user/rescuer. The display unit comprises input means and at least one indicator and is adapted to activate the indicators based on the output from the processing device.

The output from the processing device may be simple signals indicating whether the measured depth/force/ventilation lies within or outside the thresholds of the threshold device, if there have been no compressions in a predetermined time interval, etc. The output from the processing device may alternatively be a more complex signal, for example an oscillating signal representing the relationship between depth and time and/or between force and time, and/or between force and depth, a signal representing number of compressions per time, rate of compressions per time, etc. The output from the processing device may also comprise several signals and/or several types of signals.

The indicator(s) are devices or arrangements adapted to provide feedback to the user on different characteristics of the CPR session for example as graphical and/or other kinds of visual presentation. The indicator(s) may be of any type, such as audible, visible, tactile, for example a tone signal, a voice message from a speaker, curve, text or any symbol on a screen, one or several light emitting diode(s) (LEDs), a vibration generator, impulse generator, etc. Several indications may also be performed by one indicator, or several indicators may be comprised in one unit/arrangement, for example embodied as different areas of a screen.

In one embodiment, the input means is adapted for inputting an oscillating signal (having an amplitude and a frequency), and the at least one indicators comprise a first indicator adapted to be activated when the amplitude of the oscillating signal reaches a maximum value and a second indicator adapted to be activated when the amplitude of the oscillating signal reaches a minimum value.

The oscillating signal is for example the signal output from the processing unit, which represents the depth-time or force-time relation of compressions. This may be a sinusoidal signal, the amplitude and frequency corresponding to the depth or force and the frequency (rate) of the compressions, respectively.

In one embodiment the first and the second indicators have different states depending on the number of occurrences of maximum and minimum amplitude, respectively, of the input signal over a period of time. In an embodiment where the indicators are light indicators, the different states may correspond to different intensities of an indicator. For example the light intensity of a LED may increase for each instance of the amplitude of an oscillating signal reaching a maximum or minimum during a predetermined number of oscillations or decrease if the signal does not reach a maximum or minimum during a time interval. The maximum/minimum may correspond to or be identical to the thresholds of the threshold device and may for example be the recommended compression depth and/or the minimum force for releasing the compression pressure. In this way, the operator/rescuer will be able to see if he/she has reached the maximum/minimum during the last few compressions without having to watch the indicator constantly.

In one embodiment the display unit comprises a third indicator adapted to be activated partially or fully depending on the input signal's amplitude. This will give the operator an indication on how deep the compressions are with respect to the recommended depth. This may be done by means of different intensities of a light, a sound signal, etc. In one embodiment the third indicator comprises a number of LEDs, for example arranged in a row, and the number of LEDs which are activated depends on the amplitude of the input signal. In another embodiment, the third indicator is or is embodied on an OLED screen, for example by activating sections of a sector/area, the size or location of the activated sector/area being dependent on the amplitude of the input signal.

In one embodiment, the display unit comprises a fourth indicator adapted to be activated by a secondary signal derived from the input signal's frequency. This secondary signal may for example correspond to the number of compressions performed per time unit and is an important factor for ensuring quality of CPR.

The fourth indicator comprises, in one embodiment, at least three zones, a central zone and at least two side zones, and the central zone is adapted to be activated when the signal's frequency lies within a maximum and a minimum value, and the side areas are activated when the signal frequency are over/under the maximum and minimum value, respectively.

The display unit may, in one embodiment, comprise a fifth indicator adapted to be activated when there is no input signal during a predetermined period of time. This is feedback to remind the operator to continue the CPR procedure. The fifth indicator may be a light, with constant or variable intensity, a clock/time counter, or a sound signal.

DETAILED DESCRIPTION OF PREFERRED EMBODIMENTS

Figure 1:
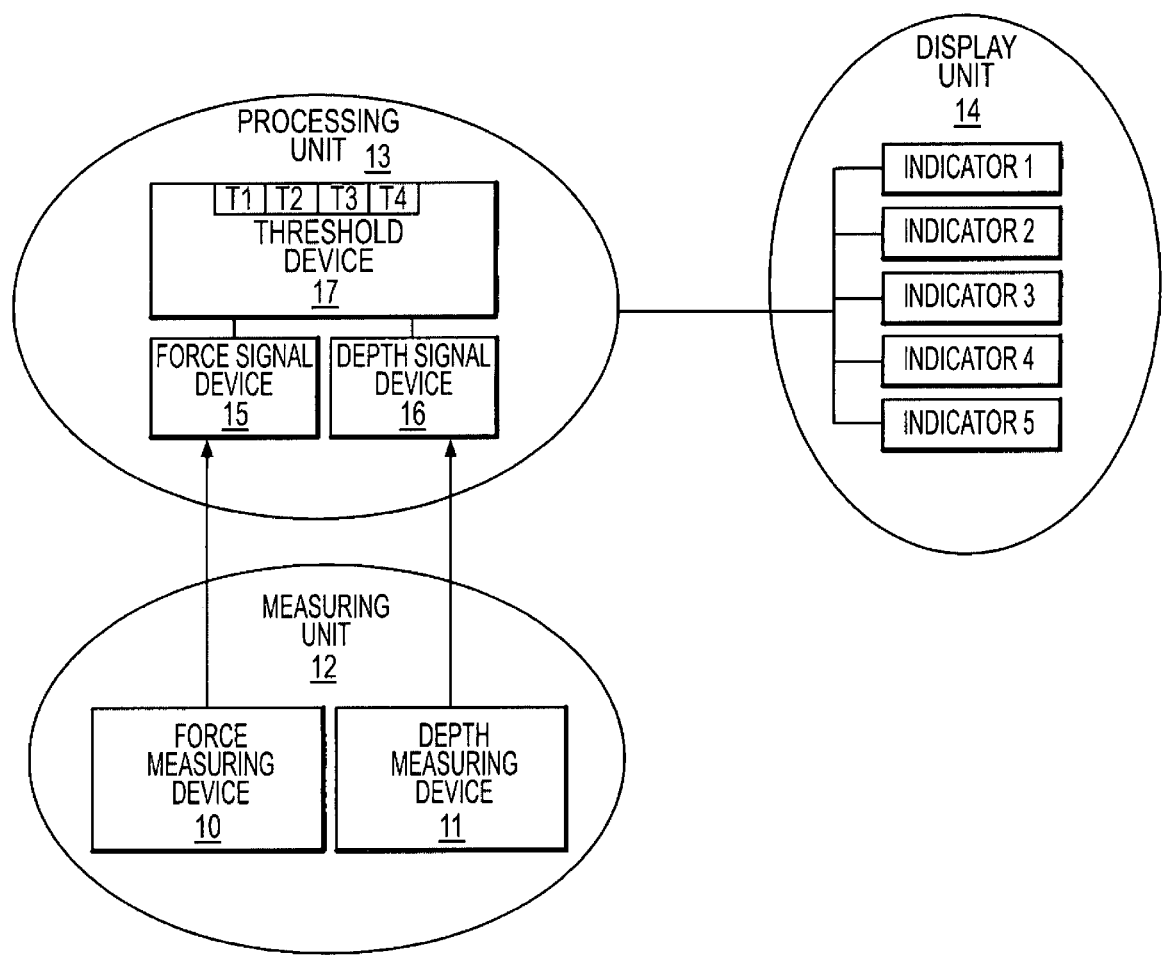
FIG. 1 is a block diagram of an embodiment of the system according to an embodiment of the present invention.

FIG. 1 shows a block diagram of an embodiment of the system according to the invention. The system comprises a measuring unit 12, a processing unit 13, and a display unit 14. The measuring unit 12 includes a force measuring device 10, a depth measuring device 11, or both. The depth measuring device 11 and force measuring device 10 measure the depth and force, respectively, of compressions performed on a patient (not shown).

The depth measuring device 11 may be any suitable device able to measure the depth of each of the compressions in a precise manner. In one embodiment, the depth measuring device 11 is an accelerometer. The signal from the accelerometer integrated twice leads to a depth signal. The calculation of depth from the acceleration signal may be performed by the processing unit 13. There may be one, two, or a number of accelerometers, and each accelerometer may be a one- or two-axis accelerometer, in order to provide reference signals and/or measure movement in different directions, for example measure movement in and perpendicular to the preferred compression direction. The accelerometers may be arranged inside or outside the device. In one embodiment the system only comprises one accelerometer.

The force measuring device 10 may be any suitable device able to measure the compression forces exerted on the patient. In one embodiment the force measuring device 10 is a pressure sensitive film.

Examples of possible depth and force measuring devices 10, 11 are described in EP 1057451 (Laerdal Medical AS).

The signals from the force measuring device 10 may be used in combination with the signals from the depth measuring device 11, or only one of the depth and force measurements may be used alone. The current international guidelines specify or recommend the correct depth of the compressions, but the force measurements can give additional information which further assures the quality of the CPR. The possibility of combining depth and force measurements provide a flexibility in use and the ability to adapt to new guidelines and/or new knowledge, for example due to future research. For example different patients may require different force in order to achieve the same compression depth. Different depth recommendations may be made for children or patients having different chest stiffness. This means that it sometimes may be more efficient to measure compression force, while in other instances it is preferred to measure compression depth. In the case of the patient being in a moving vehicle, for example, the depth values may be deceptive, and in such cases the force measurements can be more valuable.

The system may also comprise ventilation measuring device and/or a ventilation signal device in order to measure and provide feedback regarding characteristics of the ventilation of a patient. The ventilation measuring device may be any suitable device able to measure the volume, flow and/or frequency of the ventilation.

The processing unit 13 may include a force signal device 15, a depth signal device 16, and a threshold device 17. In this embodiment, the force signal device 15 and the depth signal device 16 receive signals from the force measuring device 10 and depth measuring device 11, respectively. The threshold device stores, in this embodiment, four thresholds, T1-T4.

As it is important for the rescuer to have the information regarding his compressions substantially in real time, the processing of the force and depth measurement signals must ensure real time feedback. As the processing itself consumes time, the measurements not requiring processing, or only minor processing operations, will be most suitable for feedback. Alternatively such measurements may be used in the processing in order to compensate for time used by the processing, thus achieving real-time measurement signals closer to real time.

The processing unit 13 may be integrated in the system, for example by being comprised in a device embodying the system, or the processing unit 13 may be partly or fully an external device. The processing unit 13 may for example be a part of a defibrillator processing unit or may be adapted to cooperate and/or share resources with a defibrillator, in particular with an AED.

The processing unit 13 may also be able to control the defibrillator partially or fully, e.g. an AED, in order to be able to synchronize the operation of the defibrillator and the CPR. Alternatively, the processing unit 13 may be able to communicate with a processing device of the defibrillator, or the defibrillator may control the operation of the measuring and feedback system. This may enable the system to time the compressions and ventilations and/or to time the compressions, ventilation, and defibrillator shock. Cooperation between defibrillator and the feedback system may also enable detection of shock, automated hands-off feedback when shock is to be delivered, and guiding feedback in order to coordinate CPR and defibrillation.

The processing unit 13 processes and evaluates a force signal from the force signal device 15 and/or a depth signal from the depth signal device 16. The result of the processing/evaluation, which implies comparing outputs of the force and depth signal devices 15, 16 to thresholds T1-T4 of the threshold device 17, is output to the display unit 14. The processing unit 13 may calculate other characteristics of CPR such as stiffness of the patient's chest, frequency of compressions, curve shape of the oscillating compression force/depth signal, etc. As mentioned above, the calculation of depth from accelerometer signals may be performed by the processing unit. The processing may also involve filtering of the compression force/depth signals in order to get a clearer picture of the CPR session.

The thresholds T1-T4 are values which are used for comparing with the values of depth and force signals. The thresholds may be values preprogrammed in the processing unit 13, held in a memory device in the processing unit 13 or connected to the processing unit, or may be input from an external source. In the case where the thresholds are to be input to the processing unit 13, the processing unit 13 comprises an input unit for receiving the thresholds as well as other possible input values. The processing unit 13 may also be adapted for defining or changing the thresholds based on the results of the measurements from the measuring unit 10, for example based on force/depth signal amplitude.

In some embodiments, the thresholds include a first upper threshold corresponding to a maximum force value or a maximum depth value. In other embodiments, thresholds corresponding to both maximum force and a maximum depth are used. As the present international Guidelines specify the compression depth, the first upper threshold will in most cases be a maximum depth value corresponding to the recommended maximum depth of the compressions. In order to avoid injuries of the patient, or if guidelines change to specify maximum force, the upper threshold may correspond to the maximum recommended compression force.

In some embodiments, the thresholds also include a second upper threshold corresponding to a minimum force value. This will for example represent the minimum force that can be applied at the patient's chest without preventing blood circulation.

This is often defined as "leaning" or "incomplete release", as the rescuer often leans over the patient, and does not release the pressure on the chest completely. This can prevent the blood from flowing back to the heart and thus lead to poorer circulation than otherwise could have been obtained. Giving the rescuer feedback on whether he/she does not release pressure sufficiently will thus be important.

In one embodiment the threshold device 17 also comprises a ventilation threshold device and corresponding thresholds for ventilation, for example with respect to rate, volume, flow, etc.

The thresholds may be stored in a memory device, which may be any suitable kind of memory device such as a semiconductor storage, capacitor, magnetic memory, optical memory, etc. The memory device is in one embodiment comprised in a power supply. The memory device may be interchangeable and/or updatable in order to be able to change the stored values. The memory device may be dedicated for storing thresholds or may store other values for other processing purposes as well as software for the processing device. For example history data may be stored in the memory device, in order to be able to evaluate the resuscitation session, this may be done by recording and storing simple data such as instant or accumulated count of compressions, number of times of reaching recommended compression depth or other thresholds, frequency counts, etc, or more complex data such as the complete or partial compression force/depth curves.

The system may also be connected to or comprise a database of knowledge/experience data. This may enable the processing unit 13 to choose the adequate characteristics for each patient, for example by choosing thresholds corresponding to a compression depth which has proven to be most efficient for small/large patients, children; choosing compression depth depending on force used for compression; choosing a compression depth based on the measured relationship between compression and force for a particular patient; and the like.

The system may comprise a power supply for providing power to the measuring unit 10, display unit 14 and processing unit 13. The power supply may be included in the processing unit 13. The power supply may be internal as an integrated or detachable part of the system and/or the processing unit 13, or the power supply may be an external power supply and the system/processing unit being adapted for connection to such a power supply, for example hospital power, ambulance power, defibrillator, CPR manikin, or laptop computer.

In one embodiment the system or processing unit 13 comprises a compartment for insertion of the power supply unit and/or connections for connecting components of the system to the power supply unit. The power supply unit may be an interchangeable unit, for example a battery (chargeable or not-chargeable) or a connector adapted for connecting the system or processing unit 13 to an external power source such as an electrical outlet, hospital power, or ambulance power as mentioned above.

If the memory device is in the power supply unit, the memory device may be interchanged by changing the power supply unit. This may be useful for keeping track of updates of software/thresholds for the system. For example, the wire of the power supply unit may have different colors linked to different versions of the memory unit/thresholds. This means that if the thresholds should be updated, the distributor/manufacturer can instruct the users to change the power supply unit and thus have their system/processing unit updated. This will for example be relevant when there are changes in international guidelines for CPR (the American Heart Association (AHA) Guidelines for CPR or the European Resuscitation Council (ERC) Guidelines for Resuscitation).

The display unit 14 comprises in this embodiment five indicators Indicator 1-Indicator 5. The display unit will, based on the output from the processing unit 13 activate one or several of the indicators. The indicators provide information to the user on the quality of his/hers CPR effort and make the users able to change the way the CPR is done in order to improve the quality and thus the chances of survival of the patient.

Figure 2:
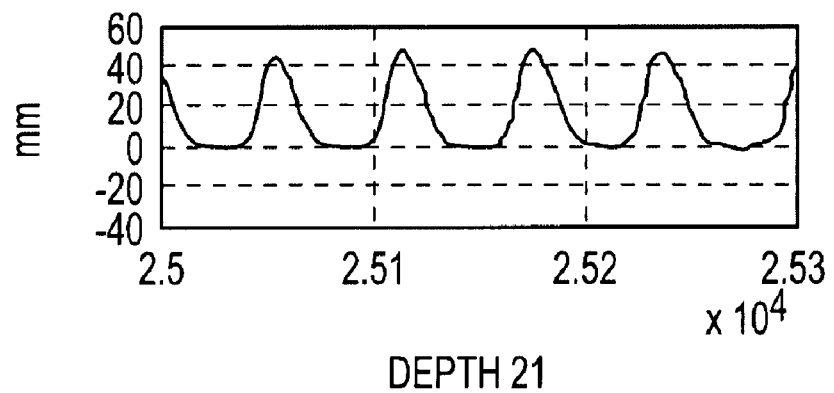
FIG. 2 shows examples of signals used in the processing unit according to an embodiment of the present invention.
Figure 2:
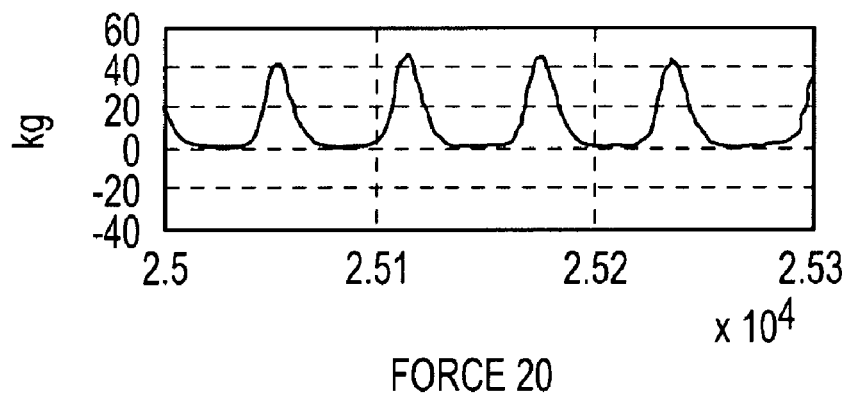
Figure 2:
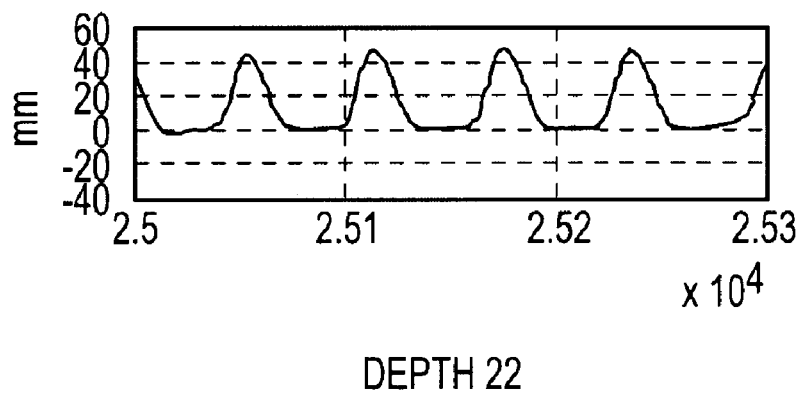

FIG. 2 shows examples of signals used in the processing unit 13 according to the invention. The force signal 20 is received directly from the force measuring device 10, while the depth signal 21 is a result of integrating an accelerometer signal twice, the integration may be performed in the processing unit 13. The processing unit 13, such as the force signal device 15 and/or depth signal device 16, may also carry out filtering processes in order to rectify the signals, remove artifacts or remove phase shifts. The result of a filtering process performed on the depth signal 21 is the depth signal 22. In the graphs, the x-axis represents time of the CPR session, and the time between compressions and the number of compressions per time may be calculated from the curves.

Figure 3A:
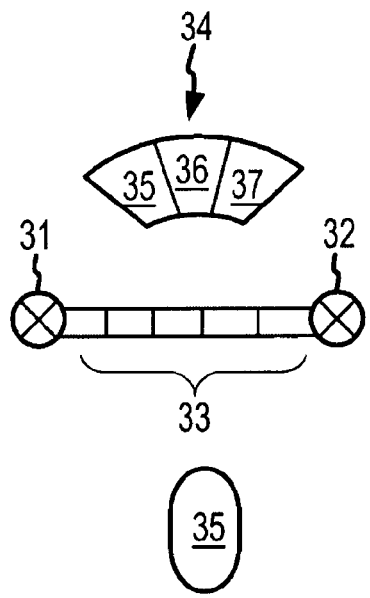
FIG. 3 shows an example of an embodiment of the display unit according to an embodiment of the present invention.
Figure 3B:
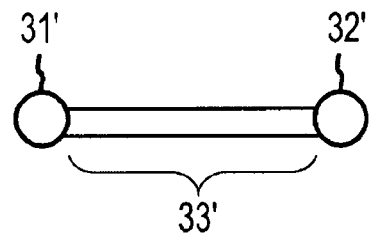

FIG. 3 shows an example of an embodiment of the display unit 14 according to the invention. FIG. 3 shows an example of an embodiment of the display unit 14 according to the invention. The display unit 14 comprises input means for inputting an oscillating signal (having an amplitude and a frequency) and at least one indicator, and is adapted to be activated when the amplitude of the oscillating signal reaches a maximum value and/or when the amplitude of the oscillating signal reaches a minimum value.

The display unit 14 comprises in this embodiment five indicators 31-35. The indicators are for example LEDs or sections of a screen. Activation of indicator 32 indicates that the operator/rescuer has reached the recommended compression depth, while the activation of indicator 31 indicates that the operator/rescuer has relieved the compression pressure sufficiently between the compressions. Whether the operator has reached the recommended compression depth and/or relieved the compression pressure sufficiently may be determined by comparing the force and/or depth signals to threshold values stored in the threshold device.

A correct CPR procedure is performed when the indicators 31, 32 are activated for each compression. In a CPR situation the rescuer's attention is often distracted by other events and persons around the rescuer, and he/she is not able to watch the display unit constantly to ensure that all compressions are being performed correctly. In one embodiment, the light intensity of indicators 31, 32 will vary depending on the number of occurrences of the rescuer reaching the correct depth or relieving compression pressure, which may be defined by the thresholds stored in the threshold device 17. For example, the LED light intensity may be at a maximum intensity after one correct compression, and then fade slowly. This means that if the operator sees a faint light, he/she knows that he has made a good compression in the near past, but that the last compression was inadequate. If he sees a bright light, he knows that the last compression was adequate. In a like manner the intensity of an indicator may depend on whether the operator adequately released pressure after a recent compression stroke.

Alternatively, the light intensity of the LEDs may increase for each correct performed compression and/or release up to a desired number, for example 2 or 3 compressions/releases.

Between indicators 31 and 32, there may be a third indicator 33. The third indicator 33 indicates, together with the first and second indicators 31, 32, the depth of the compressions. The third indicator 33 includes a section/area which is activated partly or fully depending on the depth of compression. The third indicator 33 may be a section of a screen or a number of (for example three or more) LEDs that indicate the depth of the compression up to a compression of sufficient depth. In the exemplary embodiment of FIG. 3a, with five LEDs, the activation of only one LED means that the rescuer only has only compressed the chest to 20% of the sufficient depth in a compression, an activation of two LEDs means that the compression is 40% of the recommended depth, and so on. The activation of all five LEDs will lead to an activation of the indicator 32 meaning that the compression is adequate. Alternatively, only one LED is activated each time, in such a way that 20% compression is indicated by the first LED, 40% compression by only activating the second LED, and so on. In the exemplary embodiment of FIG. 3b the third indicator 33' is a dedicated section/area on a screen and sectors of the area is activated depending on the vertical position of the rescuer's hand, i.e. the depth of the compression. This will be seen by the rescuer as a light spot running between the two max/min indicators 31', 32'.

Figure 3C:
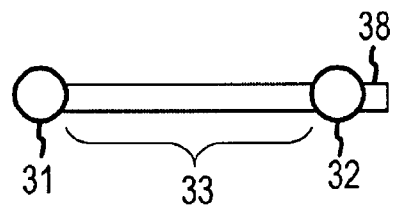

In the embodiment shown in FIG. 3c, the third indicator comprises a section 38 stretching beyond the indicator 32. The indicator 32 indicates that correct compression depth is achieved. The section 38 is activated when the rescuer compresses too deep.

A fourth indicator 34 represents in one embodiment the number of compressions performed per time unit. This quantity is derived from the depth signal, and corresponds to the frequency of the oscillations of the signal. The indicator 34 may comprise three zones 35, 36, 37, where the activation of the central zone 36 indicates that the rescuer compresses with the correct frequency. The activation of one of the side zones 35, 37, indicates the rescuer should increase/decrease the compression frequency.

A fifth indicator 35 may be activated when there have been no compressions in a period of time. This indicator reminds the rescuer of continuing the CPR session.

Figure 4A:
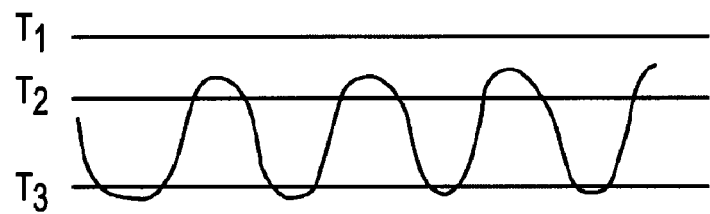
FIG. 4 is a block diagram of the operation of the display unit according to an embodiment of the present invention.
Figure 4B:
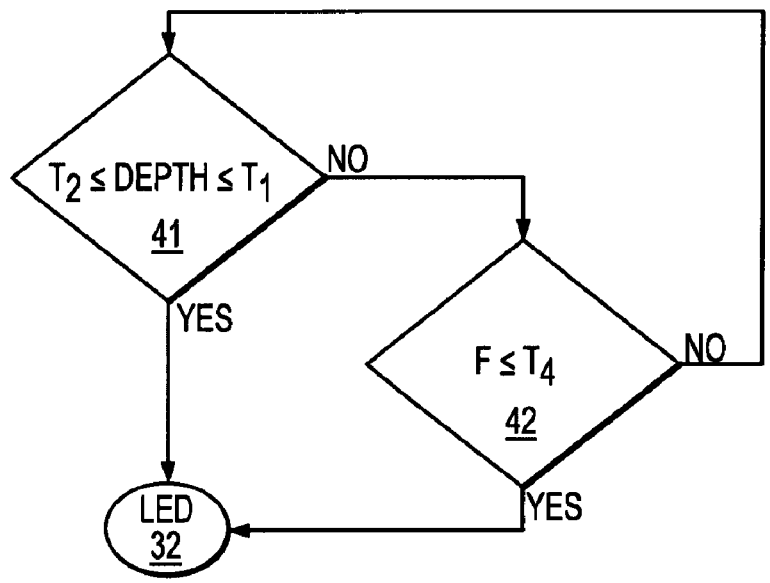
Figure 4C:
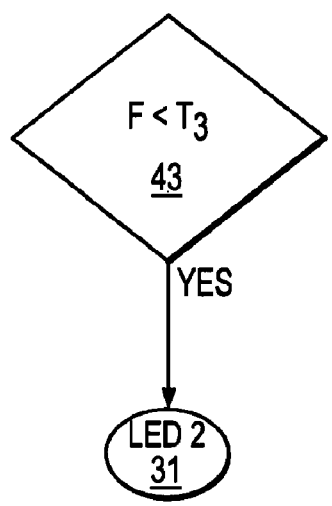

FIG. 4a-c are diagrams of the operation of the display unit 14 according to the invention. FIG. 4a shows three thresholds T1-T3 related to an oscillating signal which represents a number of compressions. Thresholds T1 and T2 represent the upper and lower threshold for the recommended compression depth, respectively, for example 52 mm and 38 mm. Threshold T3 represent the minimum allowed compression force between compressions, for example 3 kg. In FIG. 4a, all compressions are performed correctly.

FIG. 4b shows an example of the logic used for controlling the activation of indicator 32 of FIG. 3. As mentioned above, the processing unit may be adapted for defining or changing the thresholds based on the results of the measurements from the measuring unit, for example based on force/depth signal amplitude. For example, if the upper force threshold is 50 kg and 50 kg is measured, the depth measurement corresponding to this depth may be set by the processing unit to the upper depth threshold. Then the depth measurements may be used to give feedback to the user. Also, For patients having high chest stiffness, the system may be adapted to give force feedback instead of depth feedback. For the cases of very soft patients, a minimum force threshold may exist and maximum force measurements provide less satisfactory information relative to maximum depth measurements. The processing device may be adapted to choose between measurement of force or depth based on thresholds for force or depth. The processing device may for example be adapted to use the relationship between force and depth measurements as a direction on which measurements to use, for example to use only the force measurements if the relationship varies substantially over time, as this may indicate that the patient is in a moving vehicle and the accelerometer output may be unreliable.

In the illustrated embodiment, the depth of each compression is compared at 41 to the thresholds T1 and T2. If the depth lies between T1 and T2, indicator 32 is activated. If the depth lies outside T1-T2, the compression force is compared to a further threshold T4, for example 50 kg. If the compression force exceeds T4, then indicator 32 is activated. The background for this is that in some cases the chest makes a correct compression depth almost impossible to reach, and compressing with 50 kg is thus set as an adequate compression. When T4 is used as criterion for activating indicator 32, the depth corresponding to the force T4 may be measured, and this depth set as a new T2 for the continued CPR session, or the force measurements are used for activating the indicators in the continued CPR session. The calculations for activating the third indicator 33 in FIG. 3 are changed accordingly.

In one embodiment, the compression force measured when the depth of the compression(s) lies within the recommended depth threshold(s) (according to Guidelines) is registered by the processing unit, and the processing unit provides force measurements for giving the feedback to the user by warning the user if the depth measurements change significantly. This will ensure that movement of the patient in the direction of the compression (i.e. substantially vertical movement) will not influence on the measurements and give false warnings. The relationship between depth and force may in addition be checked regularly to ensure that the stiffness of the patient's chest has not changed. The processing unit 13 may also be adapted to recognise movement of the patient (for example when transferring to an ambulance) by analysing the depth signals/accelerometer signals, and then switch to only force measurements until the patient is no longer moving. When the patient is no longer moving, the use of depth measurements may be continued/resumed.

FIG. 4c shows an example of logic for controlling the activation of indicator 31 of FIG. 3. Here the compression force is compared to threshold T3, and if the compression force is less than T3, indicator 31 is activated.

In one embodiment, the processing device 13 is adapted to prioritize which feedback is most important and/or should be given first to the rescuer. This may be important when there are several measurements which lie outside the respective thresholds. In this case the processing device 13 may be able to give the most important feedback first, or mark the most important feedback in order to the indicators to emphasize this feedback when indicated to the user. The processing device 13 may for example withhold less important feedback until the more important issues are corrected. The prioritizing may be done by comparing the deviating characteristics to a pre-stored list. Such a list may for example comprise information on which characteristics must be corrected first in order to get the best result from the CPR.

What is claimed is:

1. A system for processing chest compression signals, comprising:
    a force signal device structured to produce a force signal corresponding to a chest compression force;
    a depth signal device structured to produce a depth signal corresponding to a chest compression depth; and
    a processing unit coupled to the depth signal device and the force signal device, the processing unit configured to compare one or more of the force signal and the depth signal to at least one threshold, and wherein the processing unit is further configured to lower a maximum depth threshold responsive, at least in part, to determining that the force signal exceeds a maximum force threshold.

2. The system of claim 1, wherein the at least one threshold includes a first upper threshold corresponding to a maximum force value or a maximum depth value.

3. The system of claim 1, wherein the at least one threshold includes a second upper threshold corresponding to a minimum force value.

4. The system of claim 1, comprising an input unit for threshold values.

5. The system of claim 1, comprising an external input unit.

6. The system of claim 1, wherein the at least one threshold is defined by the processing unit based on amplitudes of the force and depth signals.

7. The system of claim 1, further comprising a power supply for the processing unit comprising an input unit for threshold values.

8. The system of claim 1, further comprising a memory device.

9. The system of claim 8, where the memory device is comprised in the power supply.

10. The system of claim 1, further comprising a ventilation signal device, wherein the output signal from the processing unit also depends on values of ventilation signals with respect to the at least one threshold.

11. The system of claim 1, wherein the output signal from the processing unit depends on a prioritization of signals.

12. The system of claim 11, wherein the output signal is a first output signal, and wherein the processing unit is further structured to produce a second output indicating that a maximum delay period has elapsed since a depth signal has been received corresponding to a chest compression.

13. The system of claim 12, wherein the processing unit is further adapted to monitor the depth signal to determine a compression frequency and to produce a third output signal relating the compression frequency to a threshold frequency.

14. The system of claim 1, further comprising a ventilator and wherein the processing unit further comprises a ventilation device coupled to the ventilator to process signals from the ventilator.

15. A system for processing chest compression signals, comprising:
   a depth signal device structured to produce a depth signal corresponding to a chest compression depth;
   a force signal device structured to produce a force signal corresponding to a chest compression force; and
   a processing unit coupled to the depth signal device and the force signal device, the processing unit structured to receive the depth signal and the force signal and to select the force signal as a selected signal upon detecting a depth signal indicating that a patient is in motion, and wherein the processing unit is further structured to produce an output signal by comparing the selected signal to one or more of a plurality of thresholds.

16. The system of claim 15, wherein the processing unit is structured to monitor the force and depth signals and lower a maximum depth threshold upon detecting that the force signal exceeds a maximum force threshold and a local maximum in the depth signal does not exceed the maximum depth threshold.

17. A system for processing chest compression signals, comprising:
   a depth signal device structured to produce a depth signal corresponding to a chest compression depth;
   a force signal device structured to produce a force signal corresponding to a chest compression force; and
   a processing unit coupled to the depth signal device and the force signal device, the processing unit structured to receive the depth signal and the force signal and to select the force signal as a selected signal if the force signal exceeds a first force threshold and a substantially simultaneously occurring depth signal is below a first depth threshold, and wherein the processing unit further is structured to produce an output signal by comparing the selected signal to one or more of a plurality of thresholds.

* * * * *